US011915865B2

(12) United States Patent
Furuta et al.

(10) Patent No.: US 11,915,865 B2
(45) Date of Patent: Feb. 27, 2024

(54) DRIVE DEVICE DRIVING A MOVABLE PORTION IN A VACUUM CHAMBER

(71) Applicant: SHIMADZU CORPORATION, Kyoto (JP)

(72) Inventors: Masaji Furuta, Kyoto (JP); Kei Kodera, Kyoto (JP); Kiyoshi Watanabe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 114 days.

(21) Appl. No.: 16/978,349

(22) PCT Filed: Dec. 4, 2018

(86) PCT No.: PCT/JP2018/044579
§ 371 (c)(1),
(2) Date: Sep. 4, 2020

(87) PCT Pub. No.: WO2019/171687
PCT Pub. Date: Sep. 12, 2019

(65) Prior Publication Data
US 2021/0043350 A1 Feb. 11, 2021

(30) Foreign Application Priority Data
Mar. 8, 2018 (JP) ................................ 2018-041686

(51) Int. Cl.
*H01F 7/06* (2006.01)
*H01J 49/04* (2006.01)

(52) U.S. Cl.
CPC .......... *H01F 7/064* (2013.01); *H01J 49/0418* (2013.01)

(58) Field of Classification Search
CPC .... H01F 7/064; H01F 7/0242; H01J 49/0418; H01J 49/164; F16H 21/10; F16H 49/00; G01N 27/62
See application file for complete search history.

(56) References Cited

U.S. PATENT DOCUMENTS

| 5,896,961 A | 4/1999 | Aida et al. |
| 6,183,615 B1 * | 2/2001 | Yasar ................ H01L 21/67709 204/192.12 |
| 2012/0160674 A1 * | 6/2012 | Aoki ..................... C23C 14/568 204/298.23 |

FOREIGN PATENT DOCUMENTS

| JP | H1-94884 A | 4/1989 |
| JP | 04-089717 A | 3/1992 |

(Continued)

OTHER PUBLICATIONS

Machine translation of NTN Corp, JPH0489717A (Year: 1992).*

(Continued)

*Primary Examiner* — Bernard Rojas
(74) *Attorney, Agent, or Firm* — Sughrue Mion, PLLC

(57) ABSTRACT

A movable-side magnet is provided to a movable portion in a vacuum chamber. A drive unit is provided outside the vacuum chamber, and drives the movable portion by exerting magnetic force on the movable-side magnet. The drive unit has a first magnet, a second magnet, and a moving mechanism (moving member). The first magnet exerts magnetic force of attracting the movable-side magnet. The second magnet is provided to be adjacent to the first magnet, and exerts magnetic force of repelling the movable-side magnet. The moving mechanism integrally moves the first magnet and the second magnet.

5 Claims, 11 Drawing Sheets

(56) References Cited

FOREIGN PATENT DOCUMENTS

| | | |
|---|---|---|
| JP | H7-332433 A | 12/1995 |
| JP | 3100886 B2 | 10/2000 |
| JP | 2008-265363 A | 11/2008 |
| JP | 2009-161009 A | 7/2009 |
| JP | 2010-087982 A | 4/2010 |
| JP | 5760626 B2 | 8/2015 |
| JP | 2017-4787 A | 1/2017 |

OTHER PUBLICATIONS

Notice of Reasons for Refusal dated Sep. 21, 2021 from the Japanese Patent Office in JP Application No. 2020-504789.
International Search Report for PCT/JP2018/044579 dated Feb. 26, 2019 [PCT/ISA/210].
Written Opinion for PCT/JP2018/044579 dated Feb. 26, 2019 [PCT/ISA/210].
Chinese Office Action dated Mar. 22, 2023 in Chinese Application No. 201880090738.8.
Office Action dated Nov. 17, 2023 in Chinese Application No. 201880090738.8.

\* cited by examiner

DRIVE DEVICE DRIVING A MOVABLE PORTION IN A VACUUM CHAMBER

CROSS REFERENCE TO RELATED APPLICATIONS

This application is a National Stage of International Application No. PCT/JP2018/044579 filed Dec. 4, 2018, claiming priority based Japanese Patent Application No. 2018-041686, filed Mar. 8, 2018.

TECHNICAL FIELD

The present invention relates to a drive device for driving a movable portion provided in a vacuum chamber.

BACKGROUND ART

As an example of a mass spectrometer, a mass spectrometer using matrix-assisted laser desorption/ionization (MALDI) is known. In this type of mass spectrometer, a sample is vaporized in the vacuum chamber together with a matrix, and the sample is ionized by exchanging protons between the sample and the matrix. Then, ions obtained by the ionization of the sample can be trapped in an ion trap so that mass spectrometry can be performed.

The sample is placed on a sample stage provided in the vacuum chamber. Since this sample stage needs to be moved in the vacuum chamber, a drive device for driving a movable portion connected to the sample stage is provided (for example, refer to Patent Document 1 below).

The sample stage on which a small sample is placed is lightweight and can be moved with small driving force. Therefore, in some cases, a configuration is adopted in which a magnet (movable-side magnet) is provided in the movable portion in the vacuum chamber and a magnet (drive-side magnet) is provided outside the vacuum chamber so that the movable portion is moved using magnetic force by moving the drive-side magnet.

FIGS. 6A and 6B are schematic diagrams illustrating an example of a drive device moving a movable portion using magnetic force, in the related art. In this drive device, a wall surface 101 forming a vacuum chamber 100 is provided such that a movable-side magnet 102 is provided in the vacuum chamber 100 and a drive-side magnet 103 is provided outside the vacuum chamber 100. Each of the movable-side magnet 102 and the drive-side magnet 103 is composed of a permanent magnet. Further, in the vacuum chamber 100, a movable portion 104 to which the movable-side magnet 102 is attached is provided.

In this example, the N-pole side of the movable-side magnet 102 is attached to the movable portion 104, and the S-pole side of the movable-side magnet 102 faces the drive-side magnet 103 with the wall surface 101 interposed therebetween. The N-pole side of the drive-side magnet 103 faces the movable-side magnet 102 with the wall surface 101 interposed therebetween, and the S-pole side of the drive-side magnet 103 is connected to a moving member 105. As a result, since the S pole of the movable-side magnet 102 is attracted to the N-pole side of the drive-side magnet 103 by magnetic force, in a case where the drive-side magnet 103 is moved, the movable portion 104 to which the movable-side magnet 102 is attached can be moved according to the movement of the drive-side magnet 103.

In a case of using such a drive device, there is an advantage that a motor and drive components can be arranged outside the vacuum chamber. As a result, an expensive vacuum motor becomes unnecessary, and the movable portion 104 can be moved using an inexpensive motor. In addition, general-purpose components instead of vacuum-purpose components can be used as other parts such as a ball screw and a linear guide. As a result, the number of components and wirings in the vacuum is reduced, which also has an advantage of suppressing generation of harmful gas.

There is also an advantage that it is not necessary to use an expensive vacuum introducer. In a case where the entire drive system is installed in the vacuum chamber, a vacuum introducer is required for wirings to be connected to a vacuum motor, a position sensor, and the like. Further, in a case where the motor is installed outside the vacuum chamber, a motor-powered vacuum introducer is required. Although all of these vacuum introducers are expensive, if the drive device as described above is used, it is not necessary to adopt such an expensive vacuum introducer, and thus it is possible to reduce the manufacturing cost.

PRIOR ART DOCUMENT

Patent Document

Patent Document 1: U.S. Pat. No. 5,760,626

SUMMARY OF THE INVENTION

Problems to be Solved by the Invention

In a case where the drive-side magnet 103 is moved in one direction (left direction) as illustrated in FIG. 6A, the movable-side magnet 102 can be moved in the same direction (left direction). However, since the movable-side magnet 102 is configured to follow the drive-side magnet 103 by magnetic force, a movement-start timing of the movable-side magnet 102 is slightly delayed with respect to a movement-start timing of the drive-side magnet 103. As a result, as illustrated in FIG. 6A, a deviation (offset A) occurs between the position of the movable-side magnet 102 and the position of the drive-side magnet 103 immediately after the drive-side magnet 103 is moved in one direction (left direction).

On the other hand, in a case where the drive-side magnet 103 is moved in the other direction (right direction) as illustrated in FIG. 6B, the movable-side magnet 102 can be moved in the same direction (right direction). However, also in this case, similarly to the case of FIG. 6A, the movement-start timing of the movable-side magnet 102 is slightly delayed with respect to the movement-start timing of the drive-side magnet 103. As a result, as illustrated in FIG. 6B, a deviation (offset B) occurs between the position of the movable-side magnet 102 and the position of the drive-side magnet 103 immediately after the drive-side magnet 103 is moved in the other direction (right direction).

The reason that the above-described offsets A and B occur is that the driving force in a horizontal direction becomes small in the vicinity of the axial centers of the movable-side magnet 102 and the drive-side magnet 103 being aligned with each other. That is, it is considered that until the axial centers of the movable-side magnet 102 and the drive-side magnet 103 are largely displaced, driving force exceeding the resistance (such as friction resistance) to the movement of the movable portion 104 is not generated, and as a result, the offsets A and B are generated due to the delay of the movement of the movable-side magnet 102.

In particular, in a case where the drive-side magnet 103 is moved in the other direction (right direction) as illustrated in FIG. 6B immediately after the drive-side magnet 103 is moved in one direction (left direction) as illustrated in FIG. 6A, the drive-side magnet 103 is moved within the range of the offsets A and B, and thus the movable portion 104 may not be moved at all (so-called backlash). As described above, the drive device in the related art has a problem in that the misregistration of the movable portion easily occurs when the movable portion provided in the vacuum chamber is driven by the magnetic force.

The invention has been made in view of the above circumstances, and an object of the present invention is to provide a drive device in which misregistration of a movable portion is unlikely to occur when the movable portion provided in a vacuum chamber is driven by magnetic force.

Means for Solving the Problems (1) A drive device according to an aspect of the invention is a drive device for driving a movable portion provided in a vacuum chamber, and includes a movable-side magnet, and a drive unit. The movable-side magnet is provided to the movable portion. The drive unit is provided outside the vacuum chamber, and drives the movable portion by exerting magnetic force on the movable-side magnet. The drive unit has a first magnet, a second magnet, and a moving mechanism. The first magnet exerts magnetic force of attracting the movable-side magnet. The second magnet is provided to be adjacent to the first magnet, and exerts magnetic force of repelling the movable-side magnet. The moving mechanism integrally moves the first magnet and the second magnet.

According to such a configuration, while the magnetic force of attracting the movable-side magnet is exerted by the first magnet, the magnetic force of repelling the movable-side magnet can be exerted by the second magnet that is provided to be adjacent to the first magnet. As a result, since the range in which the movable-side magnet is attracted to the drive unit side and stabilized becomes narrow, the movable-side magnet easily follows the movement of the moving member. As a result, the delay of the movement-start timing of the movable portion with respect to the movement-start timing of the moving member is reduced. Accordingly, the misregistration of the movable portion is unlikely to occur when the movable portion provided in the vacuum chamber is driven by the magnetic force.

(2) The second magnet may be arranged point-symmetrically with the first magnet as a center.

According to such a configuration, the range in which the movable-side magnet is attracted to the drive unit side and stabilized can be narrowed to a narrow range around the first magnet by the magnetic force of the second magnet arranged point-symmetrically with the first magnet as the center. As a result, it becomes easier for the movable-side magnet to follow the movement of the moving member, and thus the misregistration of the movable portion is unlikely to occur.

(3) The second magnet may be arranged annularly around the first magnet.

According to such a configuration, the range in which the movable-side magnet is attracted to the drive unit side and stabilized can be narrowed to a narrow range around the first magnet by the magnetic force of the second magnet arranged annularly around the first magnet. As a result, it becomes easier for the movable-side magnet to follow the movement of the moving member, and thus the misregistration of the movable portion is unlikely to occur.

(4) The movable portion may be movable along a first direction. In this case, the moving mechanism may be able to integrally move the first magnet and the second magnet along the first direction.

According to such a configuration, the movable portion can be linearly moved along the first direction by integrally moving the first magnet and the second magnet along the first direction. Accordingly, it is possible to effectively suppress the misregistration of the movable portion that is linearly moved.

(5) The movable portion may be movable in a first direction and a second direction intersecting the first direction. In this case, the moving mechanism may be able to integrally move the first magnet and the second magnet along the first direction and the second direction.

According to such a configuration, the movable portion can be moved in a plane along the first direction and the second direction by integrally moving the first magnet and the second magnet along the first direction and the second direction. Accordingly, it is possible to effectively suppress the misregistration of the movable portion that is moved in the plane.

(6) The movable portion may be connected to a sample stage provided in the vacuum chamber.

According to such a configuration, when the sample stage connected to the movable portion is driven in the vacuum chamber, the misregistration of the sample stage is unlikely to occur. Therefore, the analysis can be accurately performed on the sample placed on the sample stage.

Effects of the Invention

According to the invention, since the delay of the movement-start timing of the movable portion with respect to the movement-start timing of the moving member is reduced, the misregistration of the movable portion is unlikely to occur when the movable portion provided in the vacuum chamber is driven by the magnetic force.

MODE FOR CARRYING OUT THE INVENTION

1. Configuration of Drive Device

Figure 1:
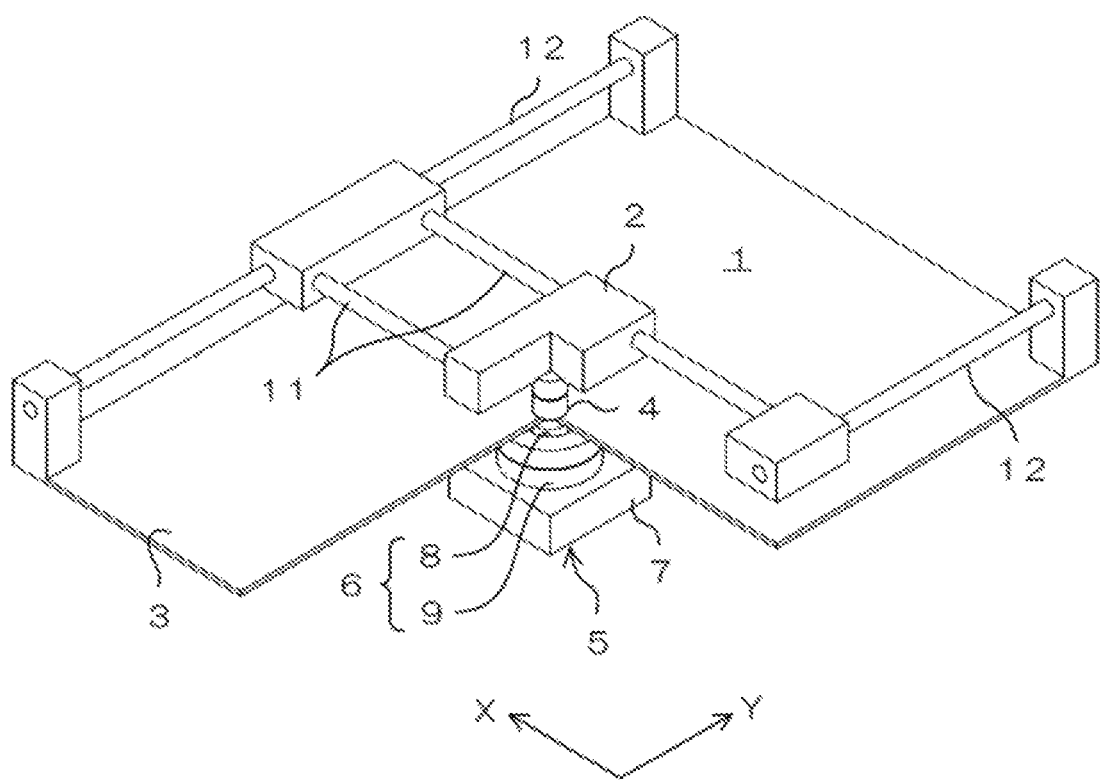
FIG. 1 is a perspective view illustrating a configuration example of a drive device and peripheral members according to an embodiment of the invention.

FIG. 1 is a perspective view illustrating a configuration example of a drive device and peripheral members according to an embodiment of the invention. The drive device is for driving a movable portion 2 provided in a vacuum chamber 1, and the vacuum chamber 1 is partitioned by a wall surface 3. The wall surface 3 is formed of for example, a thin plate-shaped member extending in the horizontal direction. In FIG. 1, the upper side above the wall surface 3 is the vacuum chamber 1, and a part of the wall surface 3 is omitted.

This drive device includes a movable-side magnet 4 and a drive unit 5. The movable-side magnet 4 is attached to the movable portion 2 and is movable in the vacuum chamber 1 together with the movable portion 2. The drive unit 5 is provided outside the vacuum chamber 1 and includes a drive-side magnet 6 and a moving member 7. The drive-side magnet 6 is composed of a first magnet 8 and a second magnet 9.

Figure 2:
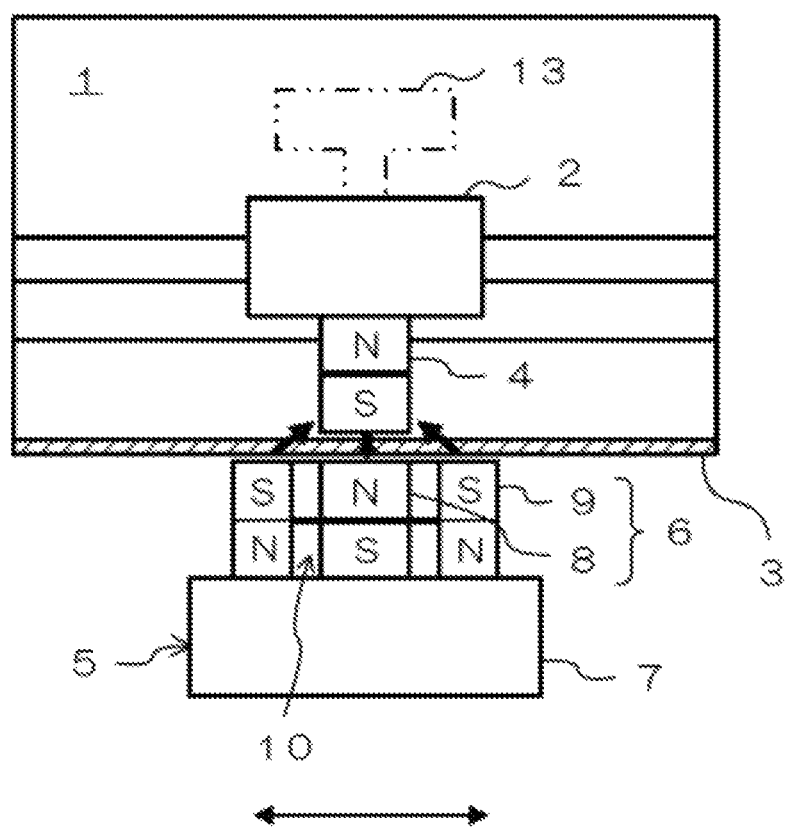
FIG. 2 is a sectional view of the drive device illustrated in FIG. 1.
Figure 3:
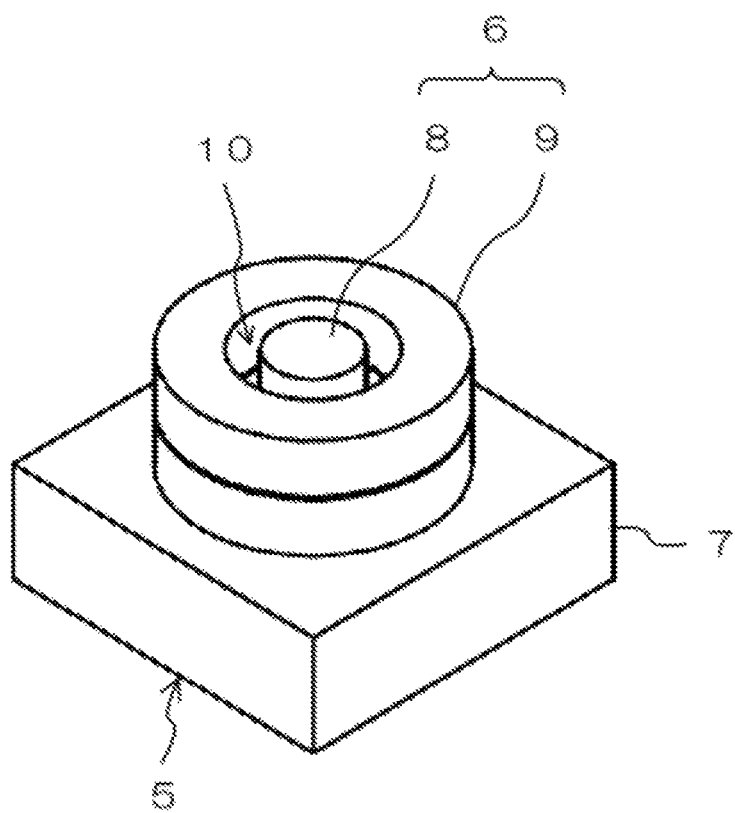
FIG. 3 is a perspective view of a drive unit.

FIG. 2 is a sectional view of the drive device illustrated in FIG. 1. FIG. 3 is a perspective view of the drive unit 5. Each of the movable-side magnet 4 and the drive-side magnet 6 (the first magnet 8 and the second magnet 9) is composed of a permanent magnet having an N pole and an S pole.

The movable-side magnet 4 is formed, for example, in a columnar shape, and extends downward while the N-pole side of the movable-side magnet 4 is attached to the lower surface of the movable portion 2. The S pole of the movable-side magnet 4 is close to the wall surface 3 from the above, and faces the wall surface 3 with a small interval so as not to contact the wall surface 3. As a result, when the movable-side magnet 4 is moved in the horizontal plane, the movable-side magnet 4 can be moved without contacting the wall surface 3 while keeping a constant small interval with respect to the wall surface 3.

The drive-side magnet 6 is provided on the opposite side of the wall surface 3 from the movable-side magnet 4. The first magnet 8 is formed, for example, in a columnar shape, and extends upward while the S-pole side of the first magnet 8 is attached to the upper surface of the moving member 7. The second magnet 9 is formed, for example, in a cylindrical shape, and extends upward while the N-pole side of the second magnet 9 is attached to the upper surface of the moving member 7.

The second magnet 9 is arranged coaxially with the first magnet 8 so as to surround the outer periphery of the first magnet 8. As a result, a constant space 10 having a cylindrical shape is formed between the outer peripheral surface of the first magnet 8 and the inner peripheral surface of the second magnet 9. That is, the second magnet 9 is provided to be adjacent to the first magnet 8 with the space 10 interposed therebetween.

The upper surfaces of the first magnet 8 and the second magnet 9 are located in the same plane (in the horizontal plane in this example). Each of the upper surfaces of the first magnet 8 and the second magnet 9 is close to the wall surface 3 from the below, and faces the wall surface 3 with a small interval so as not to contact the wall surface 3. As a result, when the drive-side magnet 6 is moved in the horizontal plane, the upper surfaces of the first magnet 8 and the second magnet 9 can be moved without contacting the wall surface 3 while keeping a constant small interval with respect to the wall surface 3.

2. Action of Magnetic Force

As illustrated in FIG. 2, in a state where the upper surface of the first magnet 8 which is the N pole faces the movable-side magnet 4 at a position vertically downward from the movable-side magnet 4 with the wall surface 3 interposed therebetween, magnetic force acts on the lower surface of the movable-side magnet 4 which has the opposite polarity (S pole) so as to attract the movable-side magnet 4 to the first magnet 8 side. In the state of FIG. 2, the upper surface of the second magnet 9 which is the S pole faces the movable-side magnet 4 at a position diagonally downward from the movable-side magnet 4 with the wall surface 3 therebetween. Therefore, the magnetic force of repelling the second magnet 9 acts on the lower surface of the movable-side magnet 4 having the same polarity (S pole) as the upper surface of the second magnet 9.

In the state as illustrated in FIG. 2, as compared with a state in which only the first magnet 8 is provided (a state in which the second magnet 9 is omitted), a range in which the movable-side magnet 4 is attracted to the drive unit 5 side and stabilized becomes narrow. That is, when the moving member 7 tries to be moved in the horizontal direction from the state where the movable-side magnet 4 and the first magnet 8 are coaxially arranged as in FIG. 2, since the repulsive force that the movable-side magnet 4 receives from the second magnet 9 becomes strong, the movable-side magnet 4 is attracted to a position coaxial with the first magnet 8. Thus, not only the magnetic force of attracting the movable-side magnet 4 by the first magnet 8 but also the magnetic force of repelling the movable-side magnet 4 by the second magnet 9 is added, so that the movable-side magnet 4 is stabilized in a narrow range in the vicinity of the position (position illustrated in FIG. 2) coaxial with the first magnet 8.

Since the first magnet 8 and the second magnet 9 are attached to the moving member 7, if the moving member 7 is moved, the first magnet 8 and the second magnet 9 can be moved integrally. A drive source such as a drive shaft or a motor (not illustrated) is connected to the moving member 7, and these members including the moving member 7 constitute a moving mechanism for integrally moving the first magnet 8 and the second magnet 9. When the first magnet 8 and the second magnet 9 are moved in the horizontal plane by this moving mechanism, magnetic force acts on the movable-side magnet 4 so that the movable portion 2 to which the movable-side magnet 4 is connected can be driven in the horizontal plane.

As described above, in the embodiment, as compared with the state in which only the first magnet 8 is provided (the state in which the second magnet 9 is omitted), a range in which the movable-side magnet 4 is attracted to the drive unit 5 side and stabilized becomes narrow. Therefore, when the moving member 7 is moved in the horizontal plane, the movable-side magnet 4 easily follows the movement of the moving member 7. As a result, the delay of the movement-start timing of the movable portion 2 with respect to the movement-start timing of the moving member 7 is reduced. Accordingly, the misregistration of the movable portion 2 is unlikely to occur when the movable portion 2 provided in the vacuum chamber 1 is driven by the magnetic force.

Further, in the embodiment, the second magnet 9 is arranged point-symmetrically with the first magnet 8 as the center. More specifically, the second magnet 9 is annularly arranged around the first magnet 8. Therefore, the movable-side magnet 4 is easily to be attracted to the position coaxial with the first magnet 8 by the repulsive force that the movable-side magnet 4 receives from the second magnet 9. Accordingly, the range in which the movable-side magnet 4 is attracted to the drive unit 5 side and stabilized can be narrowed to a narrow range around the first magnet 8. As a result, it becomes easier for the movable-side magnet 4 to follow the movement of the moving member 7, and thus the misregistration of the movable portion 2 is unlikely to occur.

3. Configuration of Movable Portion

As illustrated in FIG. 1, the movable portion 2 is movable in an X direction and a Y direction which are orthogonal to each other. That is, the movable portion 2 is movable along both a first direction (X direction) along the horizontal direction and a second direction (Y direction) orthogonal to the first direction in the horizontal plane. However, the first direction and the second direction are not limited to directions orthogonal to each other, but may be directions intersecting at a different angle, and neither is limited to the direction along the horizontal direction.

In the embodiment, the movable portion 2 is held to be slidable with respect to a first rail 11 extending along the X direction. As a result, the movable portion 2 can be moved in the X direction along the first rail 11. Further, the first rail 11 is held to be slidable with respect to a second rail 12 extending along the Y direction. As a result, the movable portion 2 held by the first rail 11 can be moved in the Y direction along the second rail 12. In this way, the movable portion 2 can be moved in both the X direction and the Y direction, and thus can be moved to any position in the horizontal plane.

The moving member 7 can also be moved in both the X direction and the Y direction similarly to the movable portion 2. Although the moving mechanism of the drive unit 5 is not specifically illustrated in FIG. 1, the moving member 7 may be configured to be moved in the X direction and the Y direction by adopting a configuration using rails similarly to the movable portion 2.

In this case, the moving mechanism can integrally move the first magnet 8 and the second magnet 9 along the first direction (X direction) and the second direction (Y direction) intersecting each other. Accordingly, since the movable portion 2 can be moved within a plane (horizontal plane) along the first direction and the second direction, it is possible to effectively suppress the misregistration of the movable portion 2 that is moved within the plane (horizontal plane).

In the embodiment, a sample stage 13 is connected to the movable portion 2 as illustrated by the two-dot chain line in FIG. 2. The sample stage 13 is provided in the vacuum chamber 1, and analysis on the sample can be performed in the vacuum chamber 1 by placing the sample on the upper surface of the sample stage 13. In a case where the sample stage 13 is connected to the movable portion 2 driven by the drive device as described above, when the sample stage 13 is driven in the vacuum chamber 1, the misregistration of the sample stage 13 is unlikely to occur. Therefore, the analysis can be accurately performed on the sample placed on the sample stage 13.

Such a drive device that drives the sample stage 13 can be applied to various analyzers such as a mass spectrometer. For example, in a mass spectrometer using MALDI, the sample stage 13 is provided in the vacuum chamber 1 for ionizing a sample, and the movable portion 2 connected to the sample stage 13 can be driven by the drive unit 5 provided outside the vacuum chamber 1.

However, the movable portion is not limited to a configuration in which the movable portion can be moved along the first direction (X direction) and the second direction (Y direction) intersecting each other, and a configuration may be adopted in which the movable portion can be moved only along any one direction. In this case, the moving mechanism (moving member 7) may be configured to be moved only along the one direction. Accordingly, since the movable portion 2 can be linearly moved along the one direction, it is possible to effectively suppress the misregistration of the movable portion 2 that is linearly moved.

4. Modified Example of Drive Unit

Figure 4A:
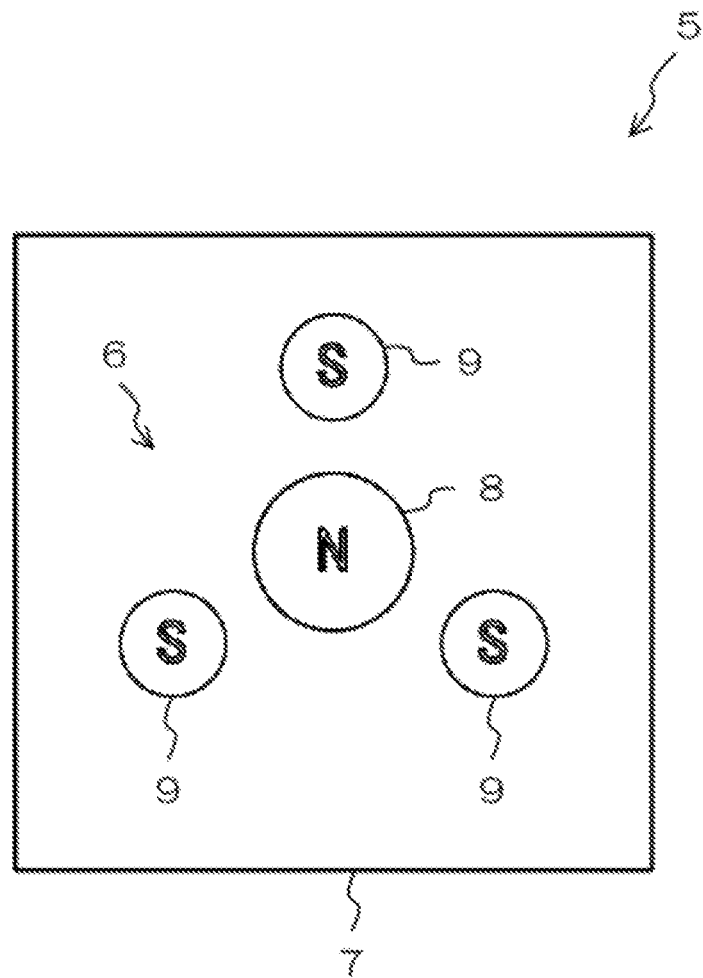
FIG. 4A is a plan view illustrating a modified example of the drive unit.
Figure 4B:
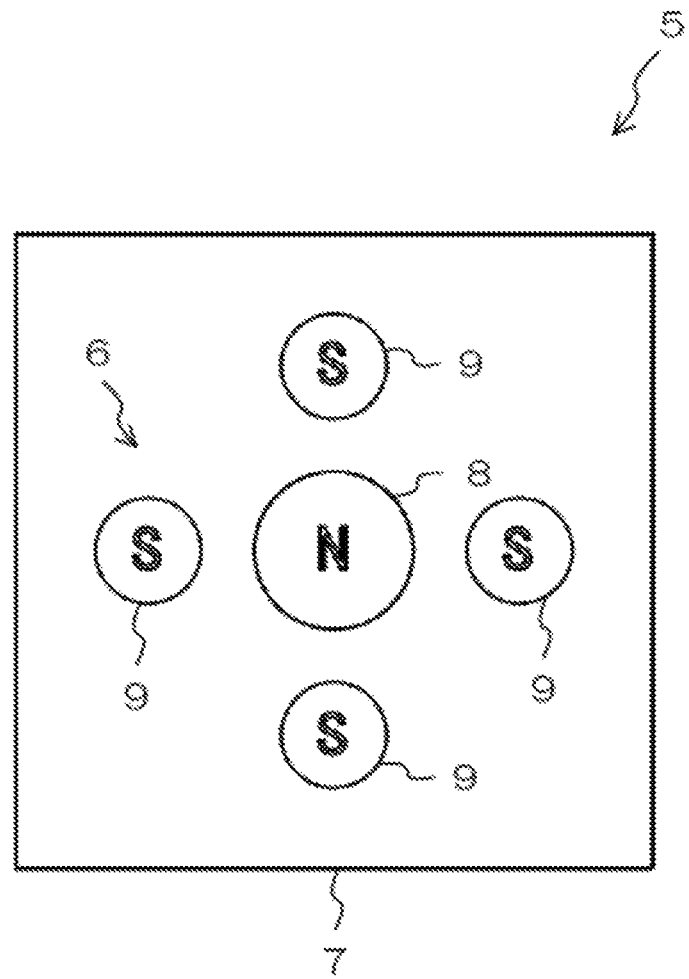
FIG. 4B is a plan view illustrating a modified example of the drive unit.
Figure 4C:
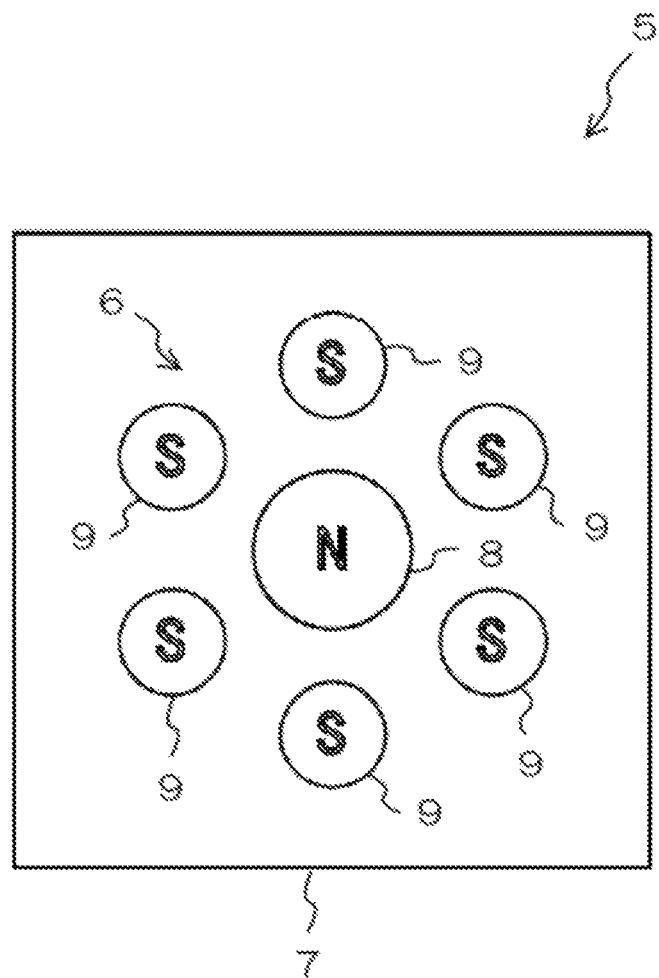
FIG. 4C is a plan view illustrating a modified example of the drive unit.

FIGS. 4A to 4C are plan views illustrating modified examples of the drive unit 5. In the examples of FIGS. 4A to 4C, a plurality of columnar-shaped second magnets 9 are annularly arranged around a columnar-shaped first magnet 8. More specifically, the plurality of columnar-shaped second magnets 9 are annularly arranged at equal intervals in the circumferential direction around the first magnet 8.

In the example of FIG. 4A, three columnar-shaped second magnets 9 are annularly arranged at intervals of 120° in the circumferential direction around the first magnet 8. In the example of FIG. 4B, four columnar-shaped second magnets 9 are annularly arranged at intervals of 90° in the circumferential direction around the first magnet 8. In the example of FIG. 4C, six columnar-shaped second magnets 9 are annularly arranged at intervals of 60° in the circumferential direction around the first magnet 8.

As described above, the number of second magnets 9 is not particularly limited, and it suffices that the plurality of columnar-shaped second magnets 9 are annularly arranged around the first magnet 8. In the example of FIG. 4B, two pairs of columnar-shaped second magnets 9 are arranged point-symmetrically with the first magnet 8 as the center. In the example of FIG. 4C, three pairs of columnar-shaped second magnets 9 are arranged point-symmetrically with the first magnet 8 as the center. However, a configuration may be adopted in which only two second magnets 9 are provided and two (one pair of) columnar-shaped second magnets 9 are arranged point-symmetrically with the first magnet 8 as the center. Further, the columnar-shaped second magnets 9 are not limited to the configuration of being arranged point-symmetrically or annularly with respect to the first magnet 8, and for example, a configuration may be adopted in which one columnar-shaped second magnet 9 is provided to be adjacent to the first magnet 8.

Figure 5A:
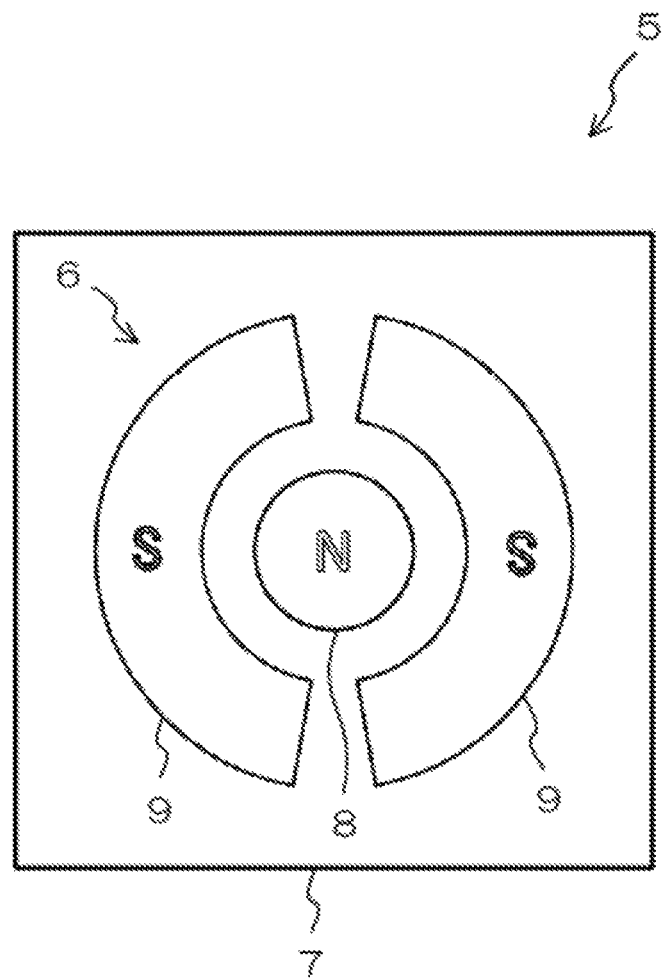
FIG. 5A is a plan view illustrating another modified example of the drive unit.
Figure 5B:
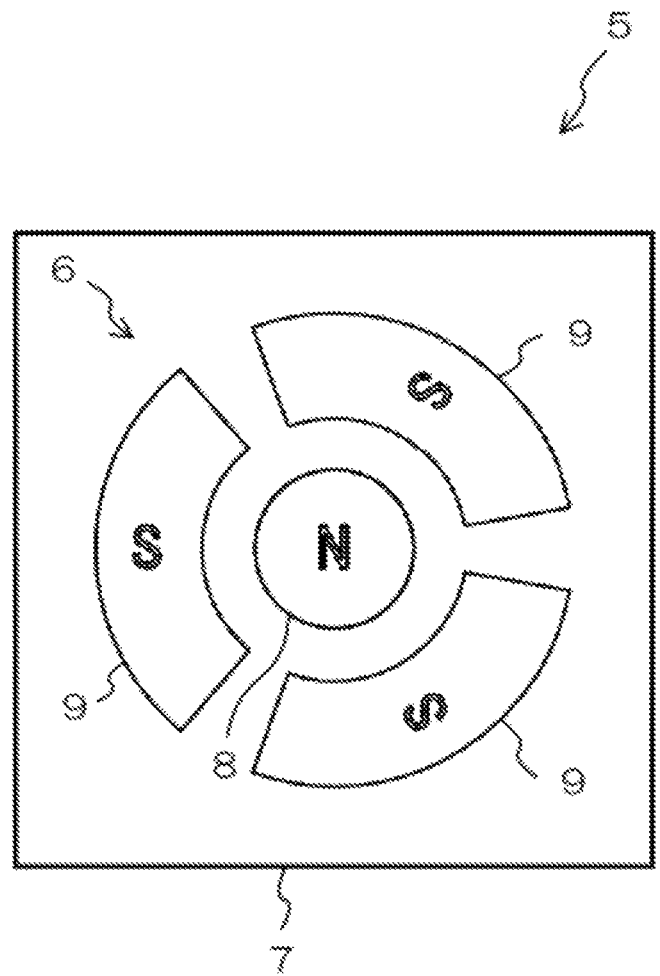
FIG. 5B is a plan view illustrating another modified example of the drive unit.
Figure 5C:
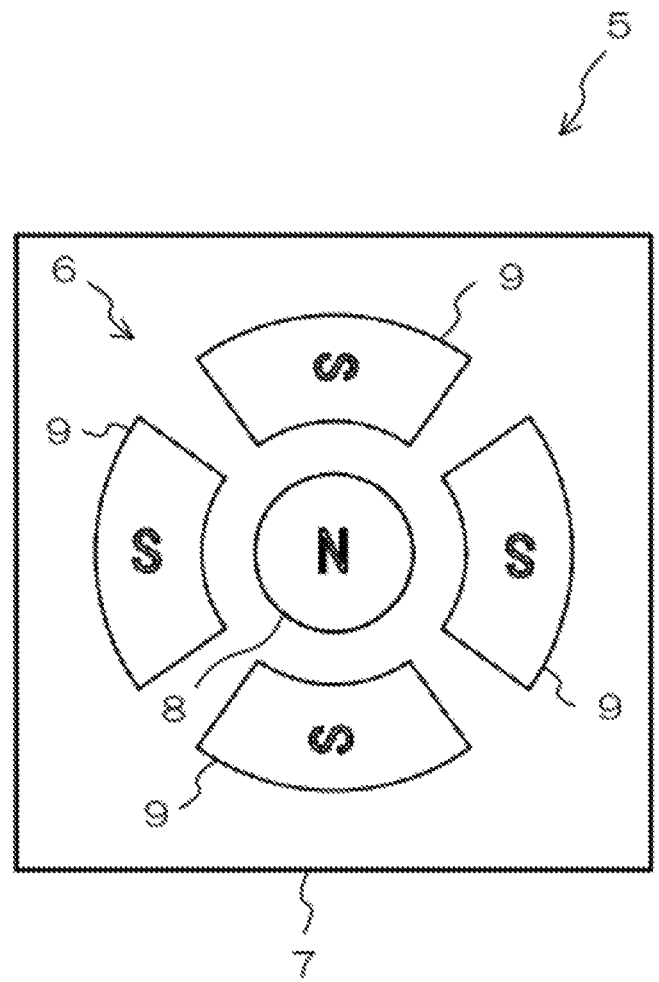
FIG. 5C is a plan view illustrating another modified example of the drive unit.
Figure 6A:
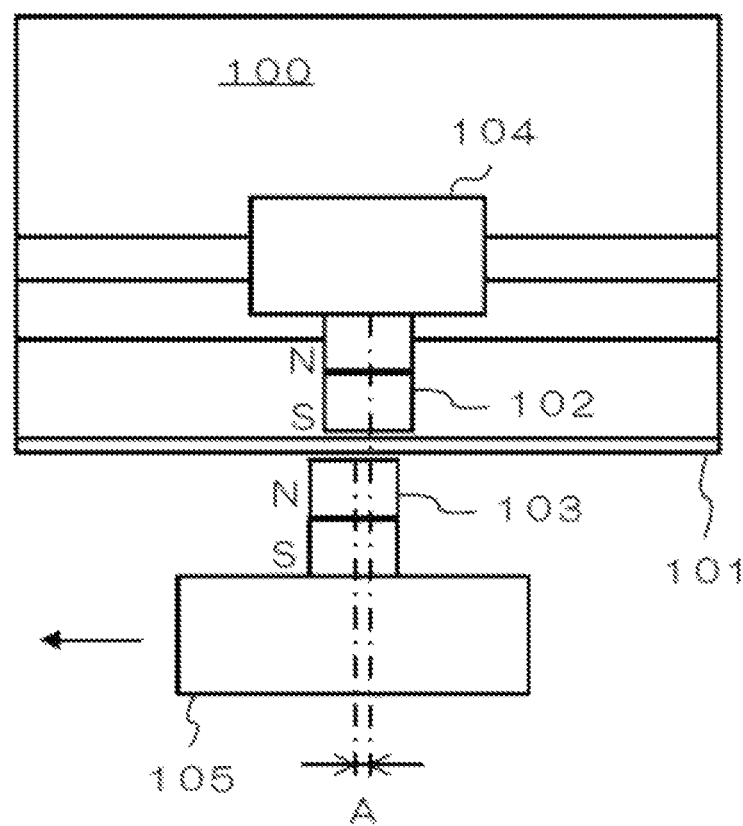
FIG. 6A is a schematic diagram illustrating an example of a drive device that moves a movable portion using magnetic force, in the related art.
Figure 6B:
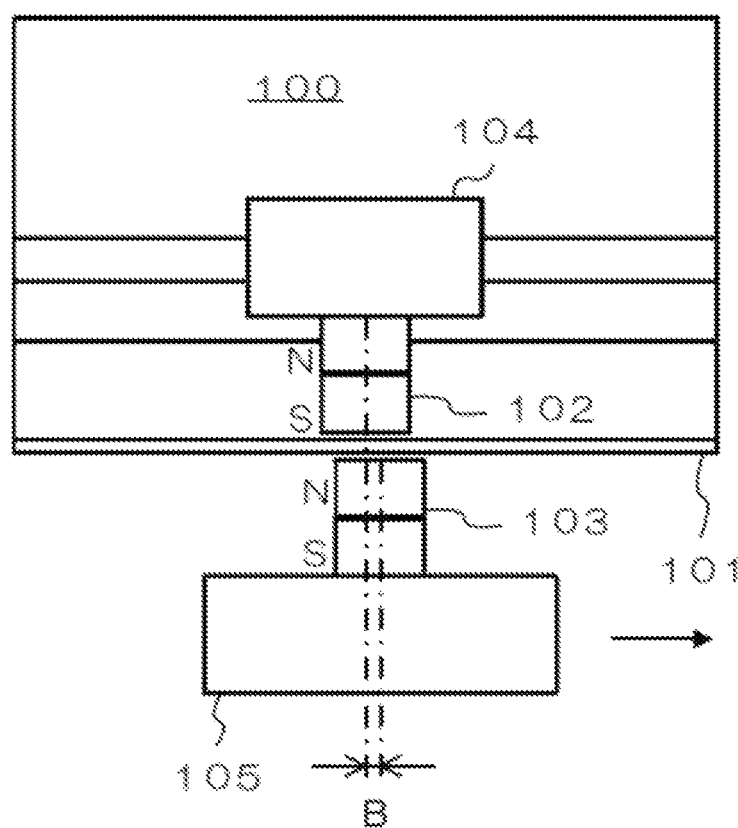
FIG. 6B is a schematic diagram illustrating an example of the drive device that moves the movable portion using magnetic force, in the related art.

FIGS. 5A to 5C are plan views illustrating other modified examples of the drive unit 5. In the examples of FIGS. 5A to 5C, a plurality of arc-shaped second magnets 9 are annularly arranged around a columnar-shaped first magnet 8. More specifically, the plurality of arc-shaped second magnets 9 are annularly arranged at equal intervals in the circumferential direction around the first magnet 8.

In the example of FIG. 5A, two arc-shaped second magnets 9 are annularly arranged at intervals of 180° in the circumferential direction around the first magnet 8. In the example of FIG. 5B, three arc-shaped second magnets 9 are annularly arranged at intervals of 120° in the circumferential direction around the first magnet 8. In the example of FIG. 5C, four arc-shaped second magnets 9 are annularly arranged at intervals of 90° in the circumferential direction around the first magnet 8.

As described above, the number of second magnets 9 is not particularly limited, and it suffices that the plurality of arc-shaped second magnets 9 are annularly arranged around the first magnet 8. In the example of FIG. 5A, one pair of arc-shaped second magnets 9 is arranged point-symmetrically with the first magnet 8 as the center. In the example of FIG. 5C, two pairs of arc-shaped second magnets 9 are arranged point-symmetrically with the first magnet 8 as the center. However, the arc-shaped second magnets 9 are not limited to the configuration of being arranged point-symmetrically or annularly with respect to the first magnet 8, and for example, a configuration may be adopted in which one arc-shaped second magnet 9 is provided to be adjacent to the first magnet 8.

5. Other Modified Examples

The shapes of the movable-side magnet 102 and the drive-side magnet 103 (the first magnet 8 and the second magnet 9) are not limited to the columnar shape and the arc shape described above, and any shape can be adopted.

Further, the polarities of the movable-side magnet 102 and the drive-side magnet 103 (the first magnet 8 and the second magnet 9) may be opposite to those in the above embodiment. That is, the N pole of the movable-side magnet 102 and the S pole of the first magnet 8 may be arranged to face each other. In this case, the second magnet 9 may be arranged such that the N-pole side thereof is close to the movable-side magnet 102.

DESCRIPTION OF REFERENCE SIGNS

1 vacuum chamber
2 movable portion
3 wall surface
4 movable-side magnet
5 drive unit
6 drive-side magnet
7 moving member
8 first magnet
9 second magnet
10 space
11 first rail
12 second rail
13 sample stage

The invention claimed is:

1. A mass spectrometer comprising a drive device for driving a movable portion, the drive device comprising:
   a vacuum chamber;
   a sample stage provided in the vacuum chamber;
   a rail that holds the movable portion to be slidable;
   a movable-side magnet provided to the movable portion provided in the vacuum chamber; and
   a drive unit that is provided outside the vacuum chamber, and drives the movable portion by exerting magnetic force on the movable-side magnet,
   wherein the drive unit has
   a first magnet that exerts magnetic force of attracting the movable-side magnet,
   a second magnet that is provided to be adjacent to the first magnet, and exerts magnetic force of repelling the movable-side magnet, and
   a moving mechanism that integrally moves the first magnet and the second magnet,
   wherein the sample stage is connected to the movable portion.

2. The mass spectrometer according to claim 1, wherein the second magnet is arranged point-symmetrically with the first magnet as a center.

3. The mass spectrometer according to claim 1, wherein the movable portion is movable along a first direction, and the moving mechanism is able to integrally move the first magnet and the second magnet along the first direction.

4. The mass spectrometer according to claim 1, wherein the movable portion is movable in a first direction and a second direction intersecting the first direction, and the moving mechanism is able to integrally move the first magnet and the second magnet along the first direction and the second direction.

5. The mass spectrometer according to claim 1, wherein the movable portion is connected to the sample stage provided in the vacuum chamber.

* * * * *